(No Model.)
J. E. MILES.
POST AUGER.
No. 293,490. Patented Feb. 12, 1884.
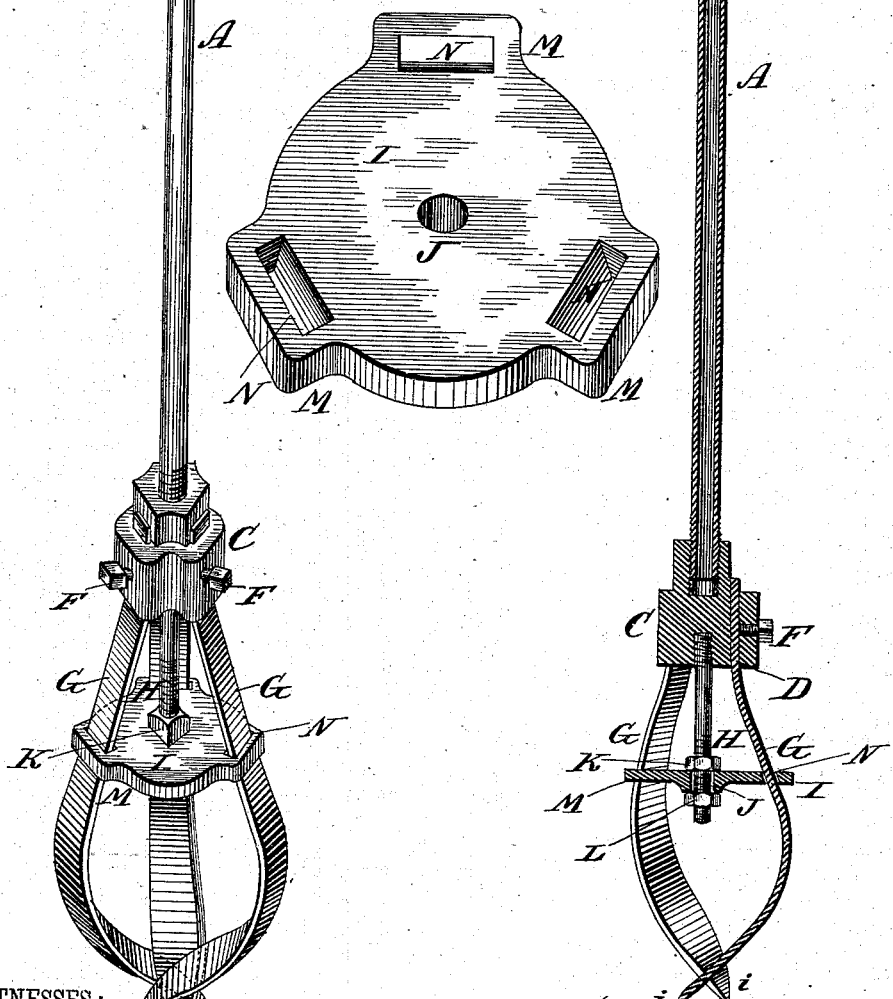

UNITED STATES PATENT OFFICE.

JOHN E. MILES, OF MARLIN, TEXAS.

POST-AUGER.

SPECIFICATION forming part of Letters Patent No. 293,490, dated February 12, 1884.

Application filed November 6, 1883. (No model.)

*To all whom it may concern:*

Be it known that I, JOHN E. MILES, a citizen of the United States, and a resident of Marlin, in the county of Falls and State of Texas, have invented certain new and useful Improvements in Post-Augers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved post-auger. Fig. 2 is a similar view of the expander-disk on an enlarged scale; and Fig. 3 is a longitudinal sectional view of the entire apparatus.

Similar letters of reference indicate corresponding parts in all the figures.

My invention has relation to post-augers or post-hole diggers; and it consists in a certain improvement upon the post-auger for which Letters Patent of the United States No. 283,010 were granted to me on the 14th day of August, 1883, the nature of which said improvement will be hereinafter more fully described and claimed.

In the accompanying drawings, the letter A indicates the shaft, having the removable cross-handle B upon its upper end, and having a block, C, fastened upon its lower end, which block has a number of recesses or sockets, D, for the insertion of the auger-blades G, which are held in place removably in their respective sockets or recesses by means of set-screws F. Fastened to and extending downwardly from the lower end of the socketed block C is a screw-threaded rod, H, which is inserted through the central aperture, J, of the expander-disk I, which is held in place adjustably upon the threaded rod H by means of the nuts K and L. This expander-disk I has wings or extensions M, corresponding in number and arrangement to the auger-blades G, each wing being provided with the beveled slot N, through which the appropriate blade is inserted. It follows that by adjusting disk I up or down by means of its nuts K L the blades may be expanded according to the diameter of the hole which it is desired to bore; and it will further be seen that disk I, with its slotted wings or projections M, serves to brace the auger-blades and to hold the same the proper distance apart and in their proper relative position to one another. The disk I also serves to raise the dirt bored or cut loose by the blades, by causing it to become compacted or packed against the disk, holding it fast until raised out by the withdrawing of the implement from the post-hole. It will also be seen that by properly adjusting the expander-disk the lower pointed ends, *i*, of the auger-blades may be so arranged as to cross one another, thereby forming a perfect auger-bit, which will penetrate even the hardest soil easily, without danger of breaking the points of the blades, as they mutually re-enforce one another.

Having thus described my invention, I claim and desire to secure by Letters Patent of the United States—

1. The combination, in a post-auger, of the socketed block, the screw-threaded rod extending from the center of the lower end of the block, the expander-disk fitting upon said threaded rod, and having the slotted wings or extensions, the two nuts for adjusting the position of the expander-disk upon the threaded rod, and the curved auger-blades, as and for the purpose shown and set forth.

2. The herein-described post-auger, consisting of the shaft, the cross-handle, the socketed block, the curved auger-blades, the set-screws securing the blades in their sockets, the screw-threaded rod extending from the center of the lower end of the block, the expander-disk having slotted wings or extensions, and the two nuts for adjusting said disk upon the threaded rod, as and for the purpose shown and set forth.

3. In a post-auger, the combination of the curved concavo-convex auger-blades and the adjustable slotted expander-disk, whereby the lower pointed ends of the blades may be arranged to cross one another, as and for the purpose shown and set forth.

In testimony that I claim the foregoing as my own I have hereunto affixed my signature in presence of two witnesses.

JOHN E. MILES.

Witnesses:
R. E. PARNELL,
E. E. MILES.